Nov. 29, 1932.  N. B. JONES  1,889,604
PROTECTIVE APPARATUS FOR FURNACES
Filed Oct. 15, 1931
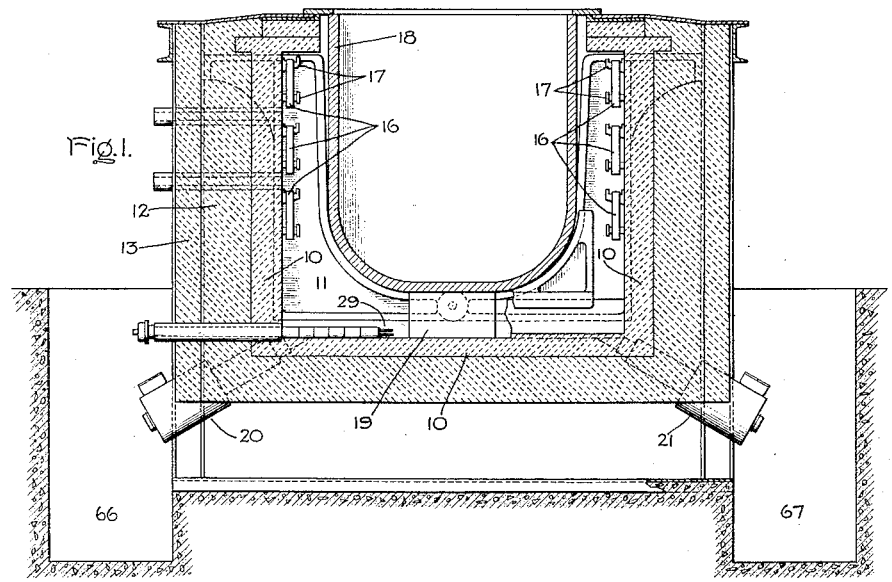
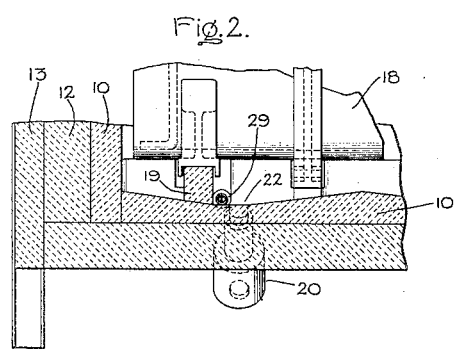
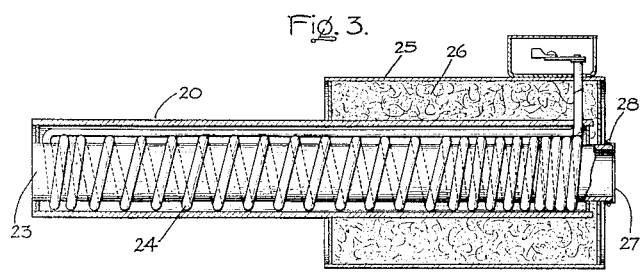
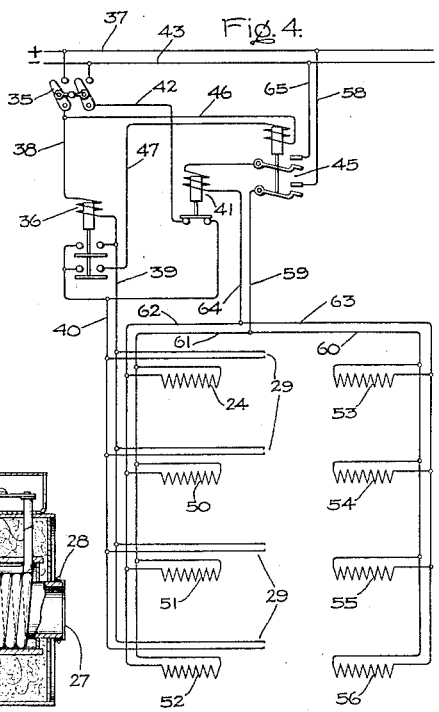
Inventor:
Norman B. Jones,
by Charles E. Tullar
His Attorney.

Patented Nov. 29, 1932

1,889,604

UNITED STATES PATENT OFFICE

NORMAN B. JONES, OF SCOTIA, NEW YORK, ASSIGNOR TO GENERAL ELECTRIC COMPANY, A CORPORATION OF NEW YORK

PROTECTIVE APPARATUS FOR FURNACES

Application filed October 15, 1931. Serial No. 568,995.

My invention relates to metal melting furnaces and has for its object the provision of a method and means for conveying any leakage metal away from the body of the furnace.

One of the greatest difficulties experienced with certain electric melting furnaces such as furnaces for melting and heating solder, lead, aluminum, etc., and melting pots for holding lead for the heat treatment of steel, is that cracks occurring in the receptacle holding the molten metal allow the hot metal to leak into the heating chamber. In many cases this molten metal damages the brick work of the furnace. Furthermore, it is extremely difficult to remove the molten metal or solidified metal from the inner supporting structure.

In carrying out my invention in one form thereof, I provide means for electrically heating outlet passage ways in the event that leakage of molten metal occurs, so that the metal is automatically removed from the interior of the furnace. More specifically, I provide outlet pipes leading from the floor of the furnace to the exterior of the furnace so that any molten metal which may escape from the receptacle may flow through these outlet pipes, together with heating means for the outlet pipes. A pair of conductors adapted to be short circuited by the molten metal are arranged to energize the heating means to prevent clogging and stoppage of the pipes by the cooling and solidification of the metal.

For a more complete understanding of my invention, reference should now be had to the accompanying drawing in which Fig. 1 is a sectional elevation of a metal melting furnace embodying my invention; Fig. 2 is a fractional section of the furnace shown in Fig. 1 illustrating the position of the outlet pipe and the protective device; Fig. 3 is a sectional view of one of the outlet pipes shown in Fig. 1, and Fig. 4 diagrammatically shows the circuit connection for the furnace.

Referring to Fig. 1 of the drawing, I have shown my invention in one form as incorporated in a melting furnace for metals having comparatively low melting temperature, such as solder, zinc, aluminum, etc., comprising inner heat refractory walls 10 forming the side and bottom walls of a heating chamber 11. Surrounding and spaced from the inner walls is a casing 13 formed of brick. The space between the inner walls and the shell is filled with a suitable heat insulating material 12, such as silicious brick. Around the inside of the heating chamber 11 are hung electric heating resistors 16. These resistors consist of flat ribbons of a suitable heat resistant material, such as nickel chromium alloy, which are hung in a series of loops on suitable supports, such as the refractory hangers 17 secured in the side walls. Suitable terminals (not shown) for the resistors are brought out through the walls 10.

Inserted in the heating chamber is a metallic receptacle or pot 18 for the metal to be heated. This receptacle is supported on the heat refractory supports 19 resting on the bottom wall of the furnace. In order to insure that all leakage metal will be directed to the outlet pipe, I provide a trough for each of the outlet pipes 20 and 21, one of the troughs being shown in Fig. 2 as indicated by the reference numeral 22.

One of the outlet pipes, as the pipe 20, shown in Fig. 3, consists of an inner pipe 23 constructed of heat resisting material, around which is wound a heating resistor 24. Suitable heat insulation is provided for the part of the outlet pipe extending from the walls of the furnace by a cylindrical casing 25 encircling a suitable amount of heat insulating material 26 such as rock wool. In order to prevent draughts of cold air from flowing through the outlet pipe into the heating chamber of the furnace, the outer end of each pipe is sealed by a paper covering 27 held in place by a cord 28. Though paper is satisfactory for this purpose, it will be understood, of course, that I contemplate the use of any material which is shattered or destroyed by the flow of molten metal through the outlet pipe.

The energization of the heating resistor provided on the outlet pipe is controlled by the flow of molten metal itself. This is accomplished by placing a protective device 29, consisting of two spaced conductors in the lowest portion of each trough so that a small amount of molten metal flowing thereto will complete a circuit through the spaced conductors.

In the operation of my invention, it will be assumed that the furnace is in operation and that the switch 35 has been operated to its closed position. It will also be assumed that for some reason or other leakage metal has collected in a metal directing trough 22 so that the conductors of the protective device 29 are short circuited. An energizing circuit is thereby completed for the relay 36 which may be traced from the supply line 37, conductor 38, the operating coil of the relay 36, by conductor 39, the protective device 29, conductor 40, the normally closed overload relay 41, and by conductor 42 to the other supply line 43. The relay 36 thereupon closes establishing an energizing circuit for the heat controlling switch 45 which circuit may be traced from supply line 37, conductor 46, operating coil of the switch 45, conductor 47, lower contacts of the relay 36, relay 41 and by conductor 42 to the other supply line 43. The switch 45 thereupon closes establishing a heating circuit for the resistances 24, 50, 51, 52, 53, 54, 55 and 56 which may be traced from the supply line 37, conductor 58, the lower contact of the switch 45, by conductor 59, and by conductors 60 and 61 to one side of each of the resistances, the other side of each of said resistances being connected to conductors 62 and 63, the circuit being completed to the other supply line 43 by conductor 64, the operating coils of the relay 41, the upper contact of the switch 45 and the conductor 65.

A holding circuit for the relay 36 was completed when this relay was operated to its closed position, which circuit may be traced from supply line 37 by conductor 38, the operating coil of the relay 36, the upper contacts of said relay, overload relay 41, and by conductor 42 to the other supply line 43. Inasmuch as the holding circuit is completed through the overload relay, protection is secured in case of a short circuit of a heating coil on one of the outlet pipes.

It will therefore be observed that whenever any molten metal escapes from the container 18 it flows into one of the hollow metal directing troughs 22, completing the energizing circuit through the protective device 29 so that each outlet pipe is immediately heated thereby preventing all clogging and stoppage of the outlet pipe due to the cooling and solidification of the molten metal. As I have indicated, the covering on the outer end of each outlet pipe is made of material which is either shattered or consumed by the molten metal so that the metal has a free passage from the heating chamber 11 of the furnace to suitable containers 66 and 67 located on either side of the furnace.

While I have shown a particular embodiment of my invention, it will be understood of course that I do not wish to be limited thereto, since many modifications may be made, and I therefore contemplate by the appended claims to cover any such modifications as fall within the true spirit and scope of my invention.

What I claim as new and desire to secure by Letters Patent of the United States, is:—

1. In combination with a receptacle for molten metal, of means for conducting molten metal escaping from said receptacle away from said receptacle comprising outlet passageways arranged in metal receiving positions below said receptacle, heating means for said passageways, and means responsive to said escaping metal for controlling said heating means.

2. In a melting furnace, a receptacle for holding molten metal, a receiver member for leakage metal mounted below said receptacle, outlet pipes extending from said receiving member to a point outside said furnace, heating resistors associated with each of said outlet pipes, and means controlled by said leakage metal for energizing said resistors.

3. In combination with a receptacle for molten metal, of means arranged in cooperating relation with said receptacle for conducting away from said receptacle molten metal escaping therefrom comprising a heated outlet pipe and means responsive to said escaping metal for controlling the heating of said outlet pipe.

4. In a metal melting furnace, a receptacle for holding molten metal, a metal directing trough arranged below said receptacle, an outlet pipe extending from said trough to a point outside said furnace, a heating resistor associated with said outlet pipe, and means for energizing said resistor whenever molten metal flows into said trough.

5. In combination with a receptacle for molten metal, of means arranged in juxtaposition to said receptacle for conducting molten metal escaping from said receptacle away therefrom comprising outlet pipes, each of said pipes being normally sealed at its lower end by material which offers substantially no resistance to the flow of molten metal.

6. A furnace comprising side and bottom walls arranged to form a heating chamber, a receptacle for molten liquid, means for mounting said receptacle in spaced relation with said walls, heating resistors in said chamber mounted on said side wall, outlet passageways extending from below said heating chamber to the outside of said walls for conducting leakage liquid to the outside of said furnace from said receptacle, and means for preventing solidification of leakage liquid in said passageways comprising heating means for said passageways.

7. In combination with a furnace having a heated receptacle supported therein for a liquid which solidifies upon cooling, of metal directing means below said receptacle, means for conducting liquid escaping from said receptacle away from said furnace comprising passageways extending from said directing means to a point outside of said furnace, heating means for said passageways, and means responsive to said escaping liquid for controlling the energization of said heating means.

In witness whereof, I have hereunto set my hand.

NORMAN B. JONES.